UNITED STATES PATENT OFFICE.

CHARLES E. ANTHONY, OF DENVER, COLORADO, ASSIGNOR, BY MESNE ASSIGNMENTS, TO THE WESTERN ELATERITE MANUFACTURING COMPANY, OF COLORADO.

COMPOSITION FOR ROOFING, PAVING, &c.

SPECIFICATION forming part of Letters Patent No. 617,706, dated January 17, 1899.

Application filed December 24, 1896. Serial No. 616,936. (No specimens.)

*To all whom it may concern:*

Be it known that I, CHARLES E. ANTHONY, a citizen of the United States of America, residing at Denver, in the county of Arapahoe and State of Colorado, have invented certain new and useful Improvements in Composition for Roofing, Paving, &c.; and I do declare the following to be a full, clear, and exact description of the invention, such as will enable others skilled in the art to which it appertains to make and use the same.

This invention is a composition of matter for use in the manufacture of roofing, paving, sheathing, floor-coverings, house-linings, and other articles.

One of the ingredients of the composition is itself a new product of my invention and is made the subject of a separate application. This product is produced by heating wurtzilite to a predetermined high temperature—say 600° Fahrenheit—in a closed retort, whereby it is rendered soluble and fusible, whereas the crude material does not possess such properties. This wurtzilite product may be said to form the base of the present composition of matter, whose other essential ingredients are asphaltum and maltha or their equivalents. A good commercial composition is produced by combining these ingredients in the following proportions: wurtzilite, two hundred pounds; asphaltum, fifty pounds; maltha, ten pounds. These ingredients are dissolved either separately or in combination.

The wurtzilite product is fusible and soluble by any solvent—such as gasolene, naphtha, turpentine, &c.—and the other ingredients are added to it and the whole mass thoroughly incorporated and reduced to a liquid state. The mixture is then ready for use. Its uses are various, and among the principal are the following:

First. Roofing or sheathing felt, &c.: The liquid mixture is spread by hand or machinery in the ordinary method of waterproofing or overlaying upon a suitable flexible backing—such as burlap, canvas, muslin, or other fabric or felt. After the mixture has been applied to such backing powdered mica is dusted or spread upon the surface thereof and the sheets thus prepared passed through rolls, so that the mica may be pressed onto the material to give a finish to the exterior surface thereof. The mica increases the durability of the article. This forms a superior material for roofing, sheathing, &c., as the composition will withstand a very high degree of heat and is unaffected by the heat of the sun. It is, moreover, very durable and is pliable in all kinds of weather.

Second. Paving: To use the composition for making pavements and the like it is mixed with sand, gravel, pulverized stone, or like material, as in ordinary common paving mixtures, the composition rendering the pavement waterproof, durable, and unaffected by ordinary temperatures or by the heat of the sun, and by reason of the elasticity of the composition it will not crack.

These are but two of the many uses to which the composition may be applied.

The above-stated proportions of ingredients of the composition may be varied according to the climate in which it is to be used. In warm climates more wurtzilite should be used than in cold climates.

As an equivalent of asphaltum in said composition, other bitumens, such as gilsonite, might be used.

As an equivalent of maltha, I can use residuum from petroleum-oils, crude petroleum, liquid asphalt, or some of the non-drying vegetable oils, such as cotton-seed oil, linseed-oil, &c.

In the place of and as an equivalent for mica I may apply powdered soap or talc, sand, asbestos, or any other suitable material.

Having thus fully described my invention, what I claim as new, and desire to secure by Letters Patent of the United States, is—

1. As a new composition of matter, the described wurtzilite product, together with asphaltum and maltha, all combined substantially as described.

2. The herein-described composition of matter consisting of two hundred parts of the specified wurtzilite product, fifty parts of asphaltum, and ten parts of maltha, substantially as and for the purpose described.

In testimony whereof I affix my signature in presence of two witnesses.

CHARLES E. ANTHONY.

Witnesses:
 ISHAM R. HOWZE,
 EDITH HIMSWORTH.